US006445894B2

(12) United States Patent
Narahara et al.

(10) Patent No.: US 6,445,894 B2
**(45) Date of Patent: *Sep. 3, 2002**

(54) METHOD OF MANUFACTURING AN IMAGE FORMING APPARATUS WITH TONER APPLIED TO A DEVELOPMENT UNIT

(75) Inventors: Shuji Narahara; Yukinori Hara, both of Fukuoka (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/742,567

(22) Filed: Dec. 20, 2000

(30) Foreign Application Priority Data

Dec. 21, 1999 (JP) .......................................... 11-362286

(51) Int. Cl.[7] ........................ G03G 15/00; G03G 21/18; B23P 21/00

(52) U.S. Cl. ......................... 399/107; 29/469; 399/113; 399/411

(58) Field of Search ................................ 399/107, 109, 399/113, 411; 29/428, 469

(56) References Cited

U.S. PATENT DOCUMENTS 5,745,824 A * 4/1998 Yashiro ...................... 399/113
5,890,036 A * 3/1999 Karakama et al. .......... 399/113
5,920,752 A * 7/1999 Karakama et al. .......... 399/113
6,163,666 A * 12/2000 Hosokawa et al. ......... 399/113
6,173,140 B1 * 1/2001 Suzuki et al. ............... 399/113

FOREIGN PATENT DOCUMENTS

| | | |
|---|---|---|
| JP | 2-61655 | 3/1990 |
| JP | 2-134670 | 5/1990 |
| JP | 02-134670 | 5/1990 |
| JP | 5-80596 | 4/1993 |
| JP | 05-080596 | 4/1993 |
| JP | 05-297646 | 11/1993 |
| JP | 5-297646 | 11/1993 |
| JP | 6-110263 | 4/1994 |
| JP | 6-186799 | 7/1994 |
| JP | 06-186799 | 7/1994 |
| JP | 06-348193 | 12/1994 |
| JP | 10-010941 | 1/1998 |

* cited by examiner

*Primary Examiner*—Susan S. Y. Lee
(74) *Attorney, Agent, or Firm*—RatnerPrestia

(57) ABSTRACT

When a photoreceptor unit and a developing unit are combined with each other, the photoreceptor does not come into direct contact with the developing unit. Accordingly, it is possible to prevent generation of scratches on the surface of photoreceptor, and lowering of electrostatic sensitivity due to scratches may be prevented. As a result, an excellent image will be formed. It improves the efficiency in the manufacture of image forming apparatus. A method of manufacturing an image forming apparatus of the present invention includes a process of applying a toner to the surface of developing roller and a process of making the developing roller with the toner applied thereto come into contact with the photoreceptor to combine the developing unit and the photoreceptor unit with each other. Preferably, the manufacturing method further includes a process of performing functional tests of a finished image forming apparatus.

22 Claims, 7 Drawing Sheets

METHOD OF MANUFACTURING AN IMAGE FORMING APPARATUS WITH TONER APPLIED TO A DEVELOPMENT UNIT

FIELD OF THE INVENTION

The present invention relates to an image forming apparatus which forms an image by placing image information on a transfer material by using electrophotographic technology.

BACKGROUND OF THE INVENTION

A conventional method of manufacturing an image forming apparatus will be described in the following. In FIG. 8 and FIG. 9 is shown a conventional method of manufacturing an image forming apparatus, and FIG. 10 is an illustrative diagram showing a state of contact between a photoreceptor unit and a developing roller in a conventional method of manufacturing an image forming apparatus.

FIG. 8, FIG.9 and FIG. 10 show a method of manufacturing an image forming apparatus in a single component developing system using a non-magnetic toner. Firstly, a process unit 1 is described. The process unit 1 comprises a photoreceptor unit 2 and a developing unit 3. The process unit 1 is the control center of the image forming apparatus.

In FIG. 8, the photoreceptor unit 2 comprises a photoreceptor 4, a charged roller 5, a cleaning blade 6, and a discharge lamp 7. The photoreceptor 4 has a surface coated with a layer of organic photoconductive material. The charged roller 5, cleaning blade 6 and discharge lamp 7 are disposed around the photoreceptor 4.

In FIG. 8, the developing unit 3 includes a developing roller 8 and a toner box 9. The toner box 9 has a function to feed a toner 10 to the developing roller 8. A stirring member 11 is fitted to the toner box 9. The stirring member 11 serves to stir the toner 10. The toner 10 is non-magnetic.

In the first place, as shown in FIG. 8, the photoreceptor unit 2 is assembled, followed by the developing unit 3. Secondly, a pin 12 is inserted into a pin hole 2*a* of the photoreceptor unit 2 and a pin hole 3*a* of the developing unit 3, thereby combining the photoreceptor unit 2 and developing unit 3 with each other. Further, as shown in FIG. 9, a spring 13 is hooked over a projection 2*b* of the photoreceptor unit 2 and a projection 3*b* of the developing unit 3. The photoreceptor unit 2 and developing unit 3 are pulled to each other by the tensile force of the spring 13, thereby causing the photoreceptor 4 and developing roller 8 to come in contact with each other. The toner 10 is filled into the toner box 9 of the developing unit 3. In this way, the process unit 1 of a conventional image forming apparatus has been manufactured.

The mechanism of the process unit 1 will be briefly described in the following with reference to FIG. 9. When the photoreceptor 4 is rotated clockwise, the area coming in contact with the charged roller 5 will be uniformly charged with approximately −600V. Next, when a laser beam as shown by arrow 50 is applied by an exposure means (not shown) to the surface of photoreceptor 4, the electric potential of the area exposed to the laser beam will be increased to approximately −100v. An electrostatic latent image having such different potentials is formed on the surface of photoreceptor 4. When negatively charged toner 10 is pressed against the electrostatic latent image by the developing roller 8, the toner electrostatically sticks to the photoreceptor 4, then the toner image is visualized and appears on the photoreceptor 4 one after another. The toner image is transferred by a transfer means (not shown) onto printing paper (not shown). After that, the toner remaining on the surface of photoreceptor 4 is removed by the cleaning blade 6, thereby physically cleaning the surface of photoreceptor 4. Also, the residual charge of the surface of photoreceptor 4 is eliminated by the discharge lamp 7, thereby electrically cleaning the surface of photoreceptor 4. These processes are repeated before going to the next image forming process.

In such conventional method of manufacturing an image forming apparatus, as shown in FIG. 10, when the developing unit 3 is combined with the photoreceptor unit 2, the surface of photoreceptor 4 comes into direct contact with the surface of developing roller 8. Accordingly, when the image forming apparatus is operated in the functional test before delivery of the product, a rubber portion 8*a* of developing roller 8 comes into direct contact with the surface of photoreceptor 4. As a result, the rubber portion 8*a* of developing roller 8 rubs against the surface of photoreceptor 4. This may cause generation of scratches 14 on the surface of photoreceptor 4 during only one turn of rotation before the toner 10 sticks to the developing roller 8. In case scratches 14 are generated on the surface of photoreceptor 4, the electrostatic sensitivity of the area of scratches 14 will be lowered, and consequently, the toner 10 will become hard to stick to the scratched area of the photoreceptor. Excessive scratches will cause generation of defective products. As a result, it will lead to lowering of the product yield and the manufacturing efficiency.

SUMMARY OF THE INVENTION

A method of manufacturing an image forming apparatus of the present invention comprises the steps of:

(a) forming a photoreceptor unit having a photoreceptor;

(b) forming a developing unit having a developing roller and a toner;

(c) applying the toner to the surface of the developing roller; and (d) setting up a combination of the developing unit having the developing roller with the toner applied and the photoreceptor unit.

Preferably, the step of setting up a combination of the developing unit and the photoreceptor unit mentioned includes a process of establishing contact between the developing roller with the toner applied to the surface and the photoreceptor to set up a combination of the photoreceptor unit and the developing unit.

Preferably, the method further comprises a step of (e) operating an assembled image forming apparatus to perform functional tests of the image forming apparatus.

In the above configuration, there exists a toner between the photoreceptor surface and the developing unit surface. Accordingly, when the photoreceptor unit and the developing unit are combined with each other, the surface of developing roller itself does not come into direct contact with the surface of photoreceptor. The toner existing between the photoreceptor surface and the developing unit surface serves to function as a lubricant. In this way, generation of scratches on the surface of the photoreceptor, due to the developing roller itself, may be prevented. As a result, an excellent image will be formed. It gives rise to the improvement of the manufacturing efficiency of the image forming apparatus.

DESCRIPTION OF THE MARKS

Figure 1:
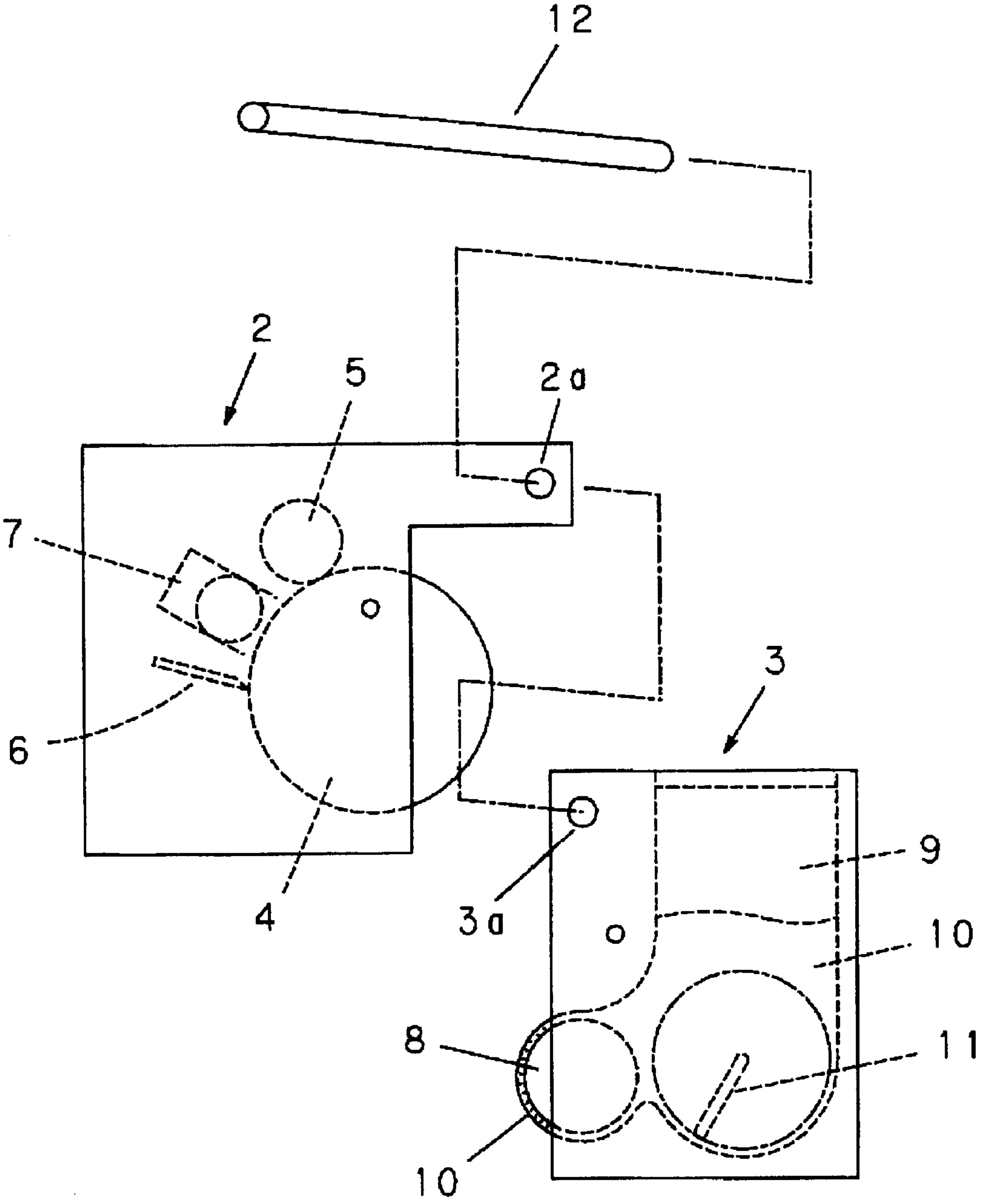
FIG. 1 is a diagram showing a method of manufacturing an image forming apparatus in accordance with one embodiment of the present invention.

1 Process unit
2 Photoreceptor unit
2*a* Pin hole
2*b* Projection
3 Developing unit
3*a* Pin hole
3*b* Projection
4 Photoreceptor
5 Charged roller
6 Cleaning blade
7 Discharge lamp
8 Developing roller
8*a* Rubber portion
9 Toner box
10 Toner
11 Stirring member
12 Pin
13 Spring
14 Scratches

DETAILED DESCRIPTION OF THE INVENTION

A method of manufacturing an image forming apparatus of the present invention comprises:

(a) a process of forming a photoreceptor unit having a photoreceptor;

(b) a process of forming a developing unit having a developing roller and a toner;

(c) a process of applying the toner to the surface of the eloping roller; and (d) a process of setting up a combination of the developing unit having the developing roller with the toner applied and the photoreceptor unit.

Preferably, the method further comprises (e) a process of operating an assembled image forming apparatus to perform functional tests of the image forming apparatus.

Preferably, a process of setting up a combination of the developing unit and the photoreceptor unit mentioned in (d) above includes a process of establishing contact between the developing roller with the toner applied to the surface and the photoreceptor to set up a combination of the photoreceptor unit and the developing unit.

Preferably, the process (d) above includes a process of combining the photoreceptor unit with the developing unit while making the developing roller with the toner applied to the surface come into contact with the photoreceptor.

Preferably, the developing roller has a first shape that is either cylindrical or columnar, the photoreceptor has a second shape that is either cylindrical or columnar, and the photoreceptor unit and the developing unit are combined with each other in a manner such that the lengthwise direction of the developing roller having the first shape is parallel to the lengthwise direction of the photoreceptor having the second shape.

Preferably, the process of applying the toner to the surface of developing roller mentioned in (c) above includes a process of applying the toner to the surface of the developing roller by rotating the developing roller.

Preferably, the photoreceptor is able to form an electrostatic latent image, and it is possible to form a toner image identical with the electrostatic latent image of the photoreceptor on the photoreceptor surface with use of the toner.

Preferably, the electrostatic latent image is formed by application of a laser beam in accordance with image data.

Preferably, the toner is non-magnetic, and the image forming apparatus employs a single component developing system.

In the above configuration, there exists a toner between the photoreceptor surface and the developing roller surface. The toner existing between the photoreceptor surface and the developing roller surface serves to function as a lubricant. Accordingly, when the photoreceptor unit and the developing unit are combined with each other, the surface of developing roller itself does not come into direct contact with the surface of photoreceptor, and therefore, generation of scratches on the surface of the photoreceptor may be prevented. And, lowering of electrostatic sensitivity due to scratches may be prevented. As a result, an excellent image will be formed. Also, it gives rise to the improvement of the product yield in the manufacturing process.

Further, when the functional test of an assembled image forming apparatus is performed by operating the image forming apparatus, the developing roller is prevented from scratching the surface of the photoreceptor. Accordingly, it is possible to improve the product yield in the manufacturing process.

An image forming apparatus in accordance with one embodiment of the present invention comprises a photoreceptor unit and a developing unit. The photoreceptor unit includes a photoreceptor, and an electrostatic latent image is formed by application of a laser beam in accordance with image data. The developing unit has a function to develop the electrostatic latent image formed on the photoreceptor. A method of manufacturing an image forming apparatus in another embodiment of the present invention comprises (a) a process of applying a toner to the surface of developing roller by rotating the developing roller of the developing unit, (b) a process of combining the photoreceptor unit with the developing unit while making the photoreceptor come in contact with the developing roller with the toner applied thereto, and (c) a process of operating an assembled image forming apparatus to perform functional tests of the image forming apparatus.

Due to this configuration, there exists a toner between the developing roller and the photoreceptor. Accordingly, when the photoreceptor unit and the developing unit are combined with each other, it is possible to prevent direct contact between the surface of developing roller itself and the surface of photoreceptor. In this way, generation of scratches on the surface of the photoreceptor and lowering of the electrostatic sensitivity due to scratches may be prevented. As a result, an excellent image will be formed. And it gives rise to the improvement of the manufacturing efficiency of the image forming apparatus.

Preferably, the developing roller is rotated until at least the area near the contact between the photoreceptor and the developing roller is completely covered with the toner applied to the developing roller, and after that, the photoreceptor unit is combined with the developing unit while the photoreceptor is in contact with the developing roller with the toner applied thereto. This configuration will bring about an additional improvement.

Preferably, in particular, the developing roller is rotated until the surface of the developing roller is completely covered with the toner applied to the developing roller, and after that, the photoreceptor unit is combined with the developing unit while the photoreceptor is in contact with the developing roller with the toner applied thereto. This configuration will bring about an additional improvement.

A method of manufacturing an image forming apparatus in accordance with another embodiment of the present invention comprises:

(a) a process of forming a plurality of photoreceptor units, wherein each of the plurality of photoreceptor units has each individual photoreceptor;

(b) a process of forming a plurality of developing units, wherein each of the plurality of developing units has each individual toner and developing roller, the individual toners have color toners different in color from each other, and the individual color toners are arranged in the individual developing units;

(c) a process of applying individual color toner to the surface of individual developing roller; and (d) a process of setting up a combination of the individual developing unit having the individual developing roller with the individual color toner applied thereto and the individual photoreceptor unit.

In this configuration, there exists the individual color toner between the individual photoreceptor surface and the individual developing roller surface. Accordingly, when the individual photoreceptor unit and individual developing unit are combined with each other, the surface of individual developing roller itself does not come into direct contact with the surface of individual photoreceptor. In this way, it is possible to prevent generation of scratches on the surface of individual photoreceptor. Thus, lowering of electrostatic sensitivity due to scratches may be prevented. As a result, an excellent color image will be formed. Further, it gives rise to the improvement of the product yield in the manufacturing process.

Preferably, it further comprises (e) a process of operating an assembled image forming apparatus to perform functional tests of the image forming apparatus.

Due to this configuration, when the functional test of an assembled image forming apparatus is performed by operating the image forming apparatus, it is possible to prevent the developing roller from scratching the surface of the photoreceptor. Accordingly, it gives rise to the improvement of the product yield in the manufacturing process.

Preferably, a process of setting up a combination of the individual developing unit and the individual photoreceptor unit mentioned in (d) above includes a process of establishing contact between the individual developing roller with the individual color toner applied to the surface and the individual photoreceptor to set up a combination of the individual photoreceptor unit and the individual developing unit.

Preferably, the process of applying the individual color toner to the surface of individual developing roller mentioned in (c) above includes a process of applying the individual color toner to the surface of individual developing roller by rotating the individual developing roller.

The individual photoreceptor unit has a function to form an electrostatic latent image formed by application of a laser beam in accordance with image data. The individual developing unit has a function to develop the electrostatic latent image.

An exemplary embodiment of the present invention will be described in the following with reference to FIG. 1~FIG. 7.

Exemplary Embodiment 1

Figure 2:
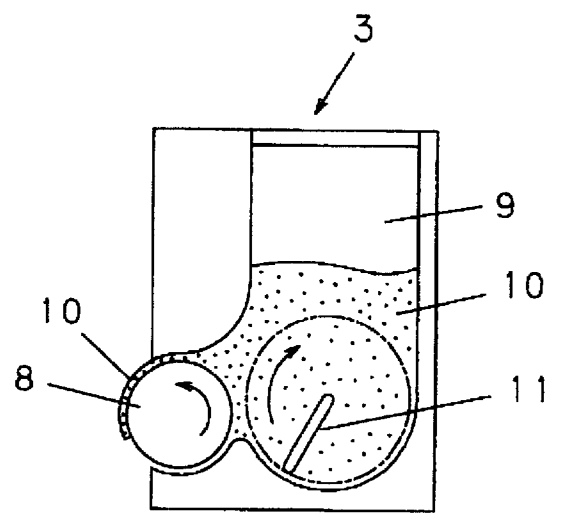
FIG. 2 is a diagram showing a state of toner application of a developing roller in a method of manufacturing an image forming apparatus in accordance with one embodiment of the present invention.
Figure 3:
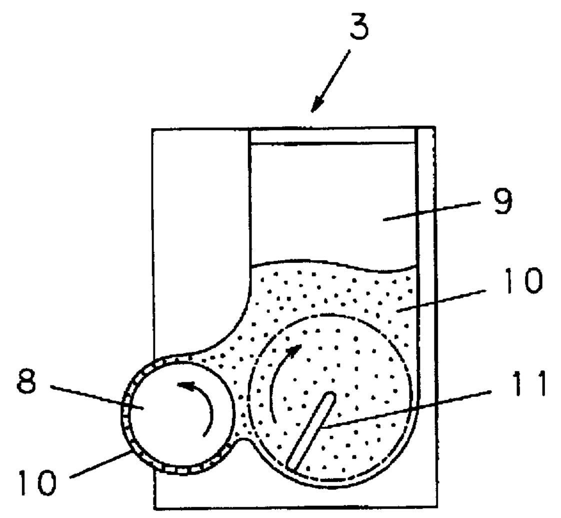
FIG. 3 is a diagram showing a state of toner application of a developing roller in a method of manufacturing an image forming apparatus in accordance with one embodiment of the present invention.
Figure 4:
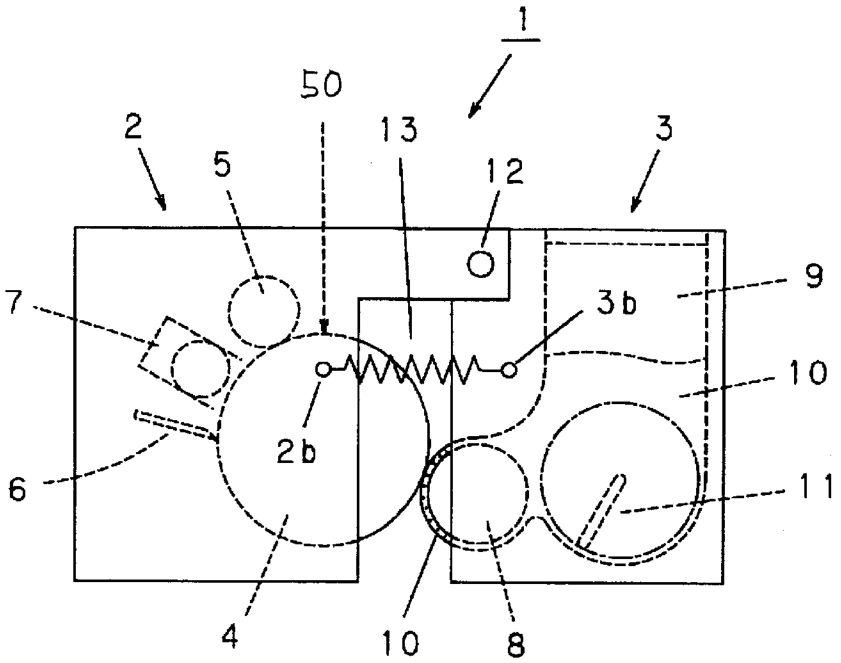
FIG. 4 is a diagram showing a method of manufacturing an image forming apparatus in accordance with one embodiment of the present invention.
Figure 5:
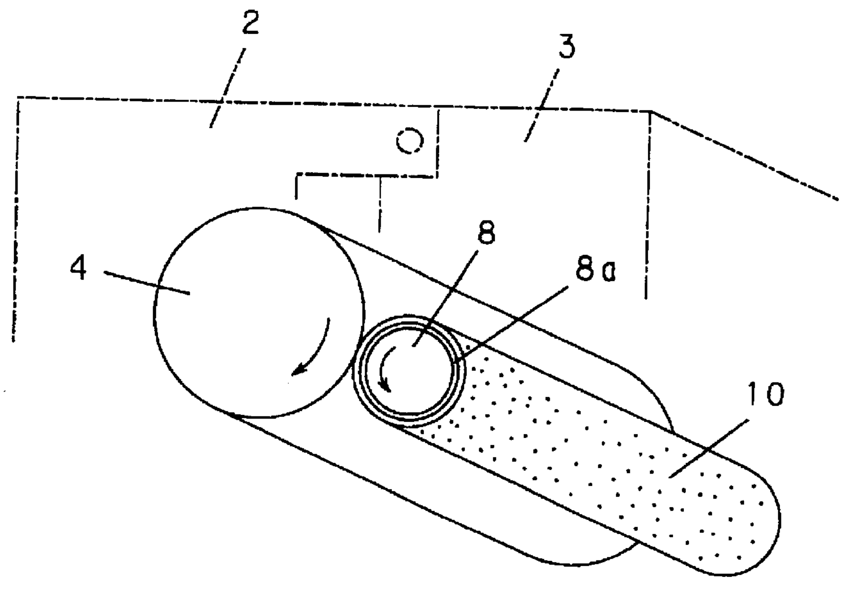
FIG. 5 is an illustrative diagram showing a contact portion between a photoreceptor and developing roller in a method of manufacturing an image forming apparatus in accordance with one embodiment of the present invention.
Figure 6:
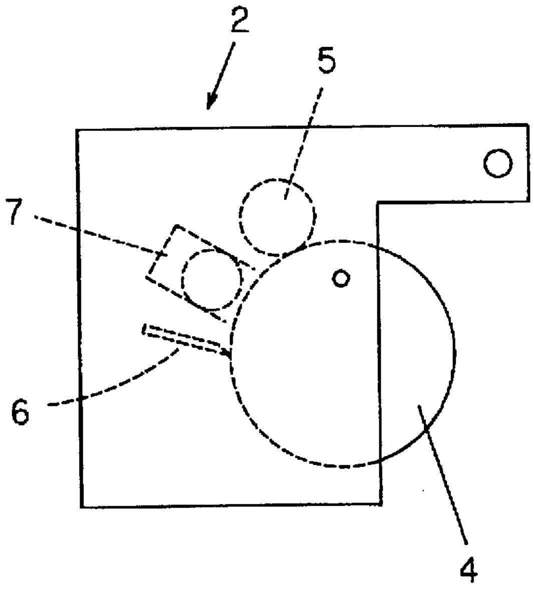
FIG. 6 is a diagram showing a configuration of a photoreceptor unit in a method of manufacturing an image forming apparatus in accordance with one embodiment of the present invention.
Figure 7:
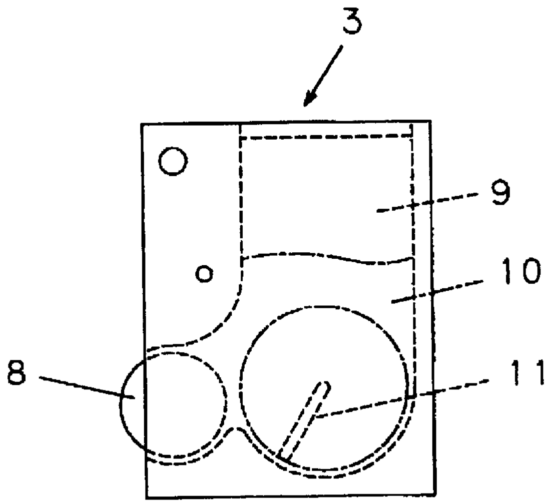
FIG. 7 is a diagram showing a configuration of a developing unit in a method of manufacturing an image forming apparatus accordance with one embodiment of the present invention.
Figure 8:
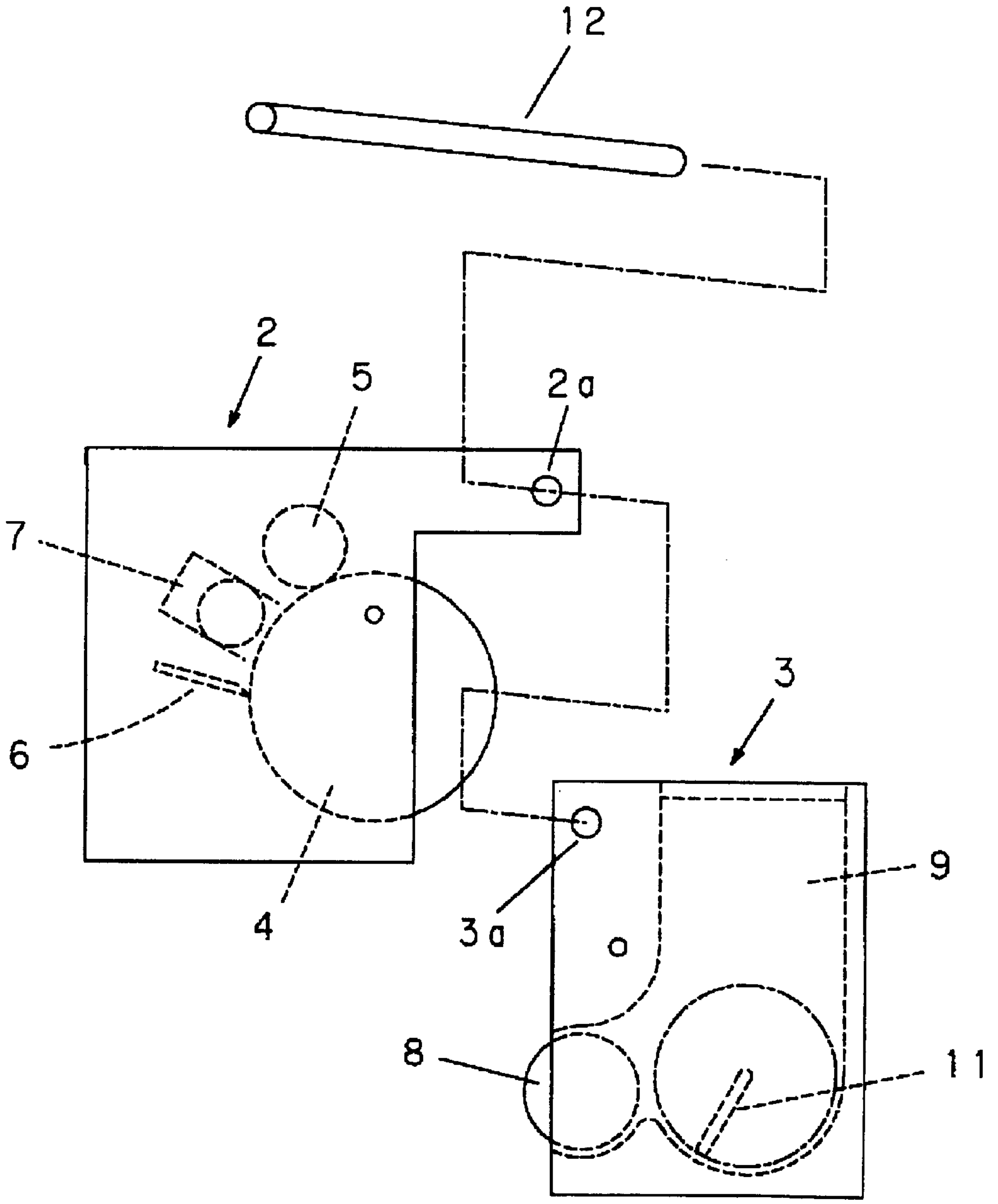
Fig. 8 PRIOR ART
FIG. 8 is a diagram showing a conventional method of manufacturing an image forming apparatus.
Figure 9:
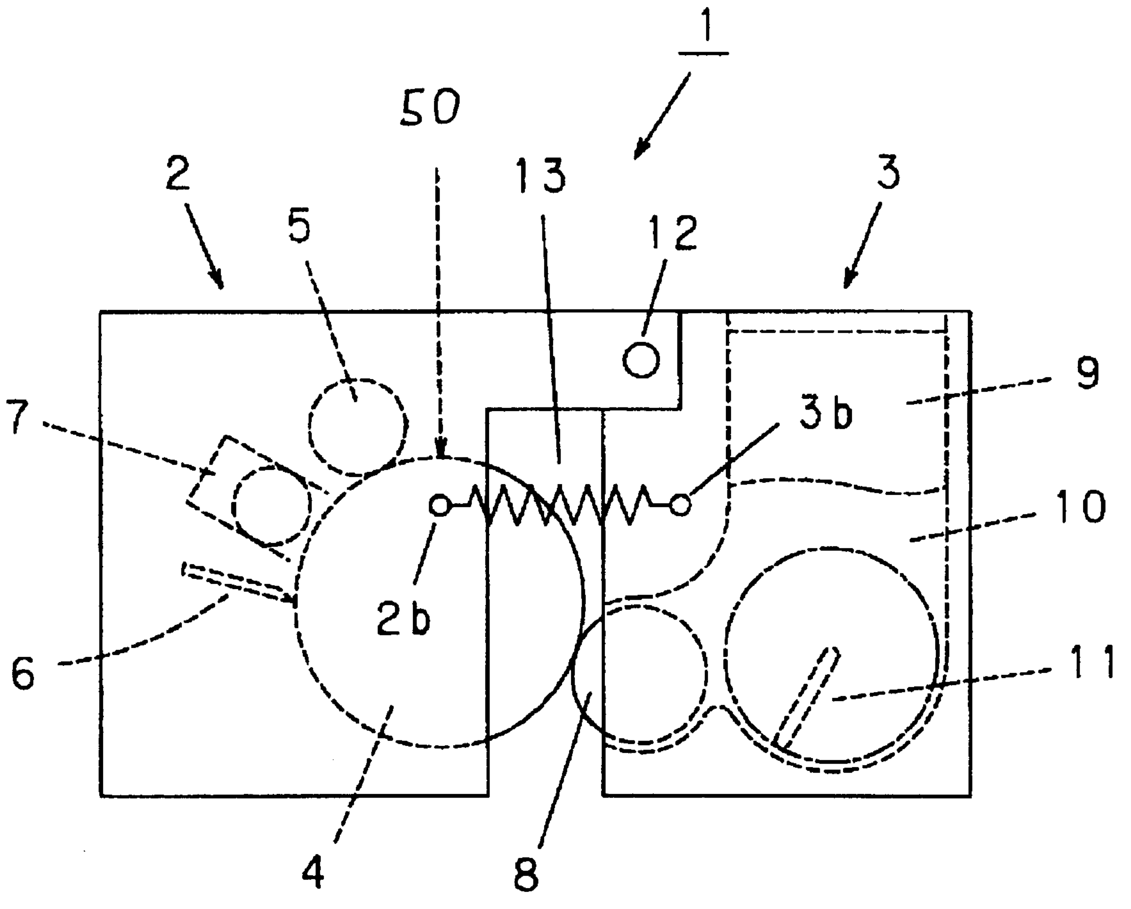
Fig. 9 PRIOR ART
FIG. 9 is a diagram showing a conventional method of manufacturing an image forming apparatus.
Figure 10:
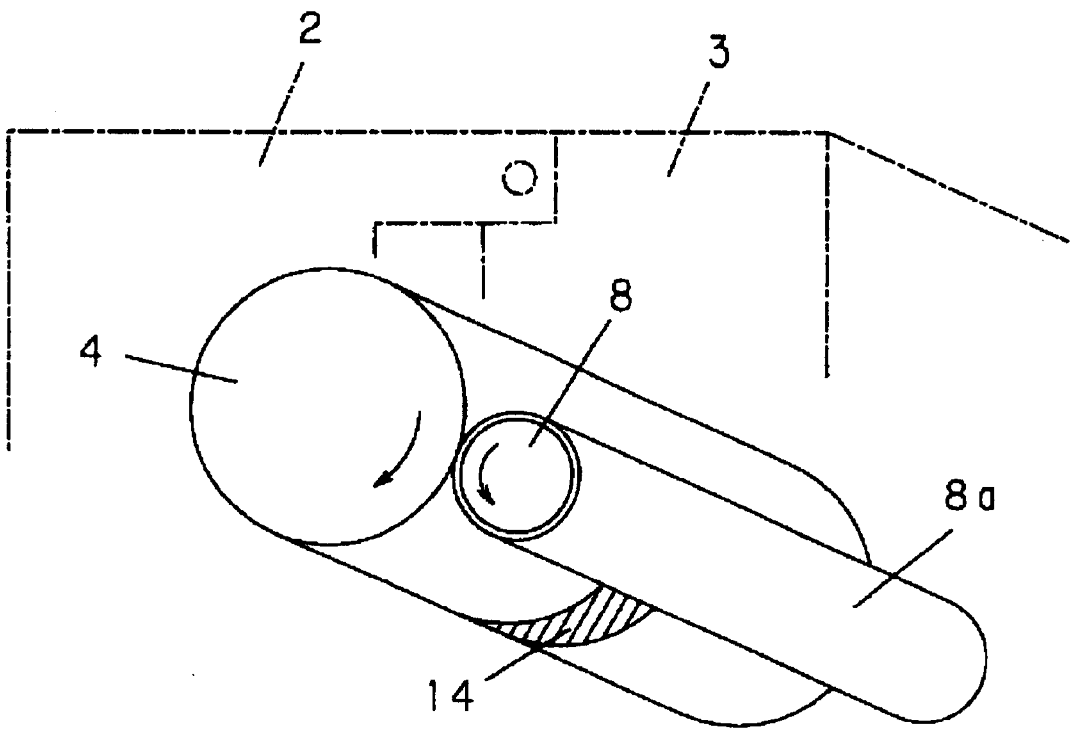
Fig. 10 PRIOR ART
FIG. 10 is an illustrative diagram showing a state of contact between a photoreceptor and developing roller in a conventional method of manufacturing an image forming apparatus.

In FIG. 1~FIG. 7 is shown a method of manufacturing an image forming apparatus in an exemplary embodiment of the present invention. FIG. 1 shows a method of manufacturing an image forming apparatus, FIG. 2 and FIG. 3 show a state of toner application to a developing roller in a method of manufacturing an image forming apparatus, FIG. 4 shows a method of manufacturing an image forming apparatus, and FIG. 5 is an illustrative diagram of a contact portion between a photoreceptor and a developing roller in a method of manufacturing an image forming apparatus. FIG. 6 shows a configuration of a photoreceptor unit in a method of manufacturing an image forming apparatus, and FIG. 7 shows a configuration of a developing unit in a method of manufacturing an image forming apparatus. FIG. 1~FIG. 7 illustrate a method of manufacturing an image forming apparatus employing a single component developing system with use of a non-magnetic toner.

Firstly, a process unit 1 is described. The process unit 1 comprises a photoreceptor unit 2 and a developing unit 3. The process unit 1 is the control center of the image forming apparatus.

In FIG. 6, the photoreceptor unit 2 comprises a photoreceptor 4, a charged roller 5, a cleaning blade 6, and a discharge lamp 7. The photoreceptor 4 has a surface coated with a layer of organic photoconductive material. The charged roller 5, cleaning blade 6 and discharge lamp 7 are disposed around the photoreceptor 4. The photoreceptor 4 has a second shape that is either cylindrical or columnar, and a sensitive material is disposed on the surface of the photoreceptor 4.

In FIG. 7, the developing unit 3 has a developing roller 8 and a toner box 9. The developing roller 8 has a first shape that is either cylindrical or columnar. The toner box 9 has a function to feed a toner 10 to the developing roller 8. A stirring member 11 is fitted to the toner box 9. The stirring member 11 serves a function to stir the toner 10. The toner 10 is non-magnetic. The photoreceptor unit 2 shown in FIG. 6 and the developing unit 3 shown in FIG. 7 are identical in configuration with the photoreceptor unit 2 and the developing unit 3 mentioned in the description of the prior art.

Next, a method of manufacturing an image forming apparatus in an exemplary embodiment of the present invention will be described with reference to FIG. 1~FIG. 7.

First, a photoreceptor unit 2 is assembled as shown in FIG. 6, and then a developing unit 3 is assembled as shown in FIG. 7.

Next, as shown in FIG. 1, a toner 10 is filled into toner box 9 of the assembled developing unit 3.

Next, the toner 10 is applied to a developing roller 8. Preferably, as shown in FIG. 2, while the toner 10 is stirred by rotation of a stirring member 11, the developing roller 8 is rotated to apply the toner 10 to the surface of developing roller 8. In the process of applying the toner 10 to the surface of developing roller 8, it is preferred to rotate the developing roller 8 until at least the area near the contact between the developing roller 8 and the photoreceptor of photoreceptor unit 2 is completely covered with the toner 10.

Preferably, as shown in FIG. 3, the developing roller 8 is rotated until the whole of the developing roller 8 is completely covered with the toner 10.

In this way, the toner 10 is applied to the surface of developing roller 8 at the developing unit 3 in advance.

Next, with the toner 10 applied to the developing roller 8, the photoreceptor unit 2 and the developing unit 3 are combined with each other. Preferably, as shown in FIG. 1, a pin 12 is inserted into pin hole 2*a* of the photoreceptor unit 2 and pin hole 3*a* of the developing unit 3, combining the photoreceptor unit 2 and the developing unit 3 with each other.

Further, as shown in FIG. 4, a spring 13 is hooked over projection 2*b* of the photoreceptor unit 2 and projection 3*b* of the developing unit 3, and thereby the photoreceptor unit 2 and the developing unit 3 are pulled to each other by the tensile force of the spring 13.

Further, as shown in FIG. 5, the developing roller 8 with the toner 10 applied to the surface comes into contact with the photoreceptor 4. The developing unit 3 and the photoreceptor unit 2 are assembled in a manner such that the cylindrical developing roller 8 and the cylindrical photoreceptor 4 come in contact with each other in a parallel fashion in the lengthwise direction. In this condition, there exists the toner 10 between the photoreceptor surface and the developing roller surface. With the photoreceptor unit 2 and the developing unit 3 assembled in this way, the toner 10 applied to the surface of developing roller 8 serves as a lubricant. Accordingly, the developing roller 8 smoothly comes in contact with the photoreceptor 4. That is, the photoreceptor 4 is prevented from coming into direct contact with the surface of the developing roller.

Before delivery of a finished image forming apparatus, the image forming apparatus is subjected to functional tests. That is, the image forming apparatus is operated for the first time. Also in the before-delivery functional test, since toner 10 is applied to the surface of developing roller 8, rubber portion 8*a* of the developing roller 8 is prevented from scratching the surface of photoreceptor 4. That is, generation of defectives in the functional test of the finished image forming apparatus may be prevented. Accordingly, it is possible to remarkably reduce the percent defective of the image forming apparatus.

The mechanism of process unit 1 is briefly described in the following with reference to FIG. 4.

Toner 10 is non-magnetic. The image forming apparatus employs a single component developing system. When photoreceptor 4 is rotated clockwise, the area coming in contact with charged roller 5 will be uniformly charged with approximately −600V. When a laser beam as shown by arrow 50 is applied by an exposure means (not shown) to the surface of photoreceptor 4 charged with approximately −600V, the electric potential of the area exposed to the laser beam will be increased to approximately −100V. Due to such difference in electric potential, an electrostatic latent image is formed on the surface of photoreceptor 4. When the toner 10 then negatively charged is pressed against the photoreceptor with such electrostatic latent image formed thereon by the developing roller 8, the toner 10 electrostatically sticks to the predetermined area of the photoreceptor corresponding to the electrostatic latent image, and thereby a toner image will be formed. Then the toner image is visualized and formed on the photoreceptor 4 one after another. That is, the developing unit 3 has a function to develop the electrostatic latent image. Next, the toner image is transferred by a transfer means (not shown) onto printing paper (not shown). After that, the toner remaining on the surface of photoreceptor 4 is removed by cleaning blade 6. Thus, the surface of photoreceptor 4 is physically cleaned. Also, the residual charge of the surface of photoreceptor 4 is eliminated by discharge lamp 7, thereby electrically cleaning the surface of photoreceptor 4. These processes are repeated.

The present exemplary embodiment comprises a process of combining the photoreceptor unit 2 with the developing unit 3 in a manner such that the surface of developing roller 8 does not come into direct contact with the photoreceptor 4. That is, a process of assembling the developing unit and the photoreceptor unit while protecting the surface of photoreceptor 4 is the difference from the prior art described above.

Exemplary Embodiment 2

A method of manufacturing an image forming apparatus in another embodiment of the present invention is a method of manufacturing an image forming apparatus for forming a color image.

A method of manufacturing an image forming apparatus in the present embodiment comprises:

(a) a process of forming a plurality of photoreceptor units, wherein each of the plurality of photoreceptor units has each individual photoreceptor;

(b) a process of forming a plurality of developing units, wherein each of the plurality of developing units has each individual toner and developing roller;

the individual toners have color toners different in color from each other;

the individual color toners are disposed in the individual developing units;

(c) a process of applying individual color toner to the surface of individual developing roller; and (d) a process of combing the individual photoreceptor unit with the individual developing unit while making the individual developing roller with the individual color toner applied to the surface come in contact with the individual photoreceptor.

Due to this configuration, it is possible to prevent generation of scratches on the surface of individual photoreceptor. Thus, lowering of electrostatic sensitivity due to scratches may be prevented. As a result, an excellent color image will be formed. Further, it gives rise to the improvement of the product yield in the manufacturing process.

Preferably, the process of applying the individual color toner to the surface of individual developing roller mentioned in (c) above includes a process of applying the individual color toner to the surface of the individual developing roller by rotating the individual developing roller.

The individual photoreceptor unit has a function to form an electrostatic latent image formed by application of a laser beam in accordance with image data. The individual developing unit has a function to develop the electrostatic latent image.

Preferably, the individual developing roller is rotated until at least the area near the contact between the individual photoreceptor and the individual developing roller is completely covered with the color toner applied to the individual developing roller, and after that, the individual photoreceptor unit is combined with the developing unit while the individual photoreceptor is in contact with the individual developing roller with the toner applied thereto. This configuration will realize an additional improvement.

Preferably, in particular, the developing roller is rotated until the surface of the developing roller is completely covered with the toner applied to the developing roller, and after that, the photoreceptor unit is combined with the developing unit while the photoreceptor is in contact with the developing roller with the toner applied thereto. This configuration will bring about an additional improvement.

In the present exemplary embodiment, each individual photoreceptor unit of a plurality of photoreceptor units and each individual developing unit of a plurality of developing units are manufactured by the same method as in the exemplary embodiment 1 described above. In this case, the toners include individual color toners disposed in individual process units. By such manufacturing method, a color image formed with a plurality of colors can be obtained. That is, the method of manufacturing an image forming apparatus in the present exemplary embodiment is adapted to the method of manufacturing an image forming apparatus corresponding to the color image based on a tandem system. A tandem system stands for a system wherein a plurality of sensitive drum process mechanisms are arranged in a series fashion.

As described above, a method of manufacturing an image forming apparatus of the present invention comprises a process of applying a toner to a developing roller of a developing unit prior to a process of combining a photoreceptor unit with a developing unit. Thus, there exists a toner between the photoreceptor surface and the developing roller surface. Accordingly, when the photoreceptor unit is combined with the developing unit, the toner applied to the developing roller serves as a lubricant, and the developing roller is prevented from scratching the surface of the photoreceptor. As a result, it gives rise to the improvement of the product yield in the manufacturing process.

What is claimed is:

1. A method of manufacturing an image forming apparatus, comprising the steps of:

(a) forming a photoreceptor unit having a photoreceptor;

(b) forming a developing unit having a developing roller and a toner;

(c) applying said toner to a surface of said developing roller; and (d) setting up a combination of said developing unit having said developing roller with said toner applied and said photoreceptor unit.

2. The method of manufacturing an image forming apparatus as defined in claim 1, further comprising a step of:

(e) operating an assembled image forming apparatus to perform functional tests of said image forming apparatus.

3. The method of manufacturing an image forming apparatus as defined in claim 1, wherein the step of setting up a combination of said developing unit and said photoreceptor unit includes a process of establishing contact between said developing roller with said toner applied to the surface of said developing roller and said photoreceptor with each other, and combining said photoreceptor unit with said developing unit.

4. The method of manufacturing an image forming apparatus as defined in claim 1, wherein the step of setting up a combination of said developing unit and said photoreceptor unit includes a process of establishing contact between said developing roller with said toner applied to the surface of said developing roller and said photoreceptor with each other, while said toner applied to the surface of said developing roller is lain between said developing roller and said photoreceptor, and combining said photoreceptor unit and said developing unit with each other.

5. The method of manufacturing an image forming apparatus as defined in claim 3, wherein said developing roller has a first shape that is at least one of cylindrical and columnar;

said photoreceptor has a second shape that is at least one of cylindrical and columnar; and said photoreceptor unit and said developing unit are combined with each other in a manner such that said developing roller having said first shape and said photoreceptor unit having said second shape are parallel to each other in the lengthwise direction.

6. The method of manufacturing an image forming apparatus as defined in claim 3, wherein the step of applying said toner to the surface of said developing roller includes a process of applying said toner to the surface of said developing roller by rotating said developing roller.

7. The method of manufacturing an image forming apparatus as defined in claim 3, wherein said photoreceptor unit is capable of forming an electrostatic latent image, and a toner image identical with said electrostatic latent image of said photoreceptor may be formed on the surface of said photoreceptor by using said toner.

8. The method of manufacturing an image forming apparatus as defined in claim 7, wherein said electrostatic latent image is formed by application of a laser beam in accordance with image data.

9. The method of manufacturing an image forming apparatus as defined in claim 1, wherein said toner is non-magnetic, and said image forming apparatus employs a single component developing system.

10. The method of manufacturing an image forming apparatus as defined in claim 1, wherein the step of applying said toner to the surface of said developing roller includes a process of rotating said developing roller until at least the area near the contact between the developing roller and photoreceptor is completely covered with said toner.

11. The method of manufacturing an image forming apparatus as defined in claim 1, wherein the step of applying said toner to the surface of said developing roller includes a process of rotating said developing roller until the whole surface of said developing roller is completely covered with said toner.

12. A method of manufacturing an image forming apparatus, comprising the steps of:

(a) forming a photoreceptor unit having a photoreceptor, wherein said photoreceptor unit has a function to form an electrostatic latent image that appears with a laser beam applied in accordance with image data;

(b) forming a developing unit having a developing roller and a toner, wherein said developing unit has a function to develop said electrostatic latent image;

(c) applying said toner to a surface of said developing roller by rotating said developing roller;

(d) establishing contact between said developing roller with said toner applied to the surface of said developing roller and said photoreceptor, and setting up a combination of said developing roller with said toner applied and said photoreceptor unit; and (e) operating an assembled image forming apparatus to perform functional tests of said image forming apparatus.

13. A method of manufacturing an image forming apparatus, comprising the steps of:

(a) forming a photoreceptor unit having a photoreceptor, wherein said photoreceptor unit has a function to form an electrostatic latent image that appears with a laser beam applied in accordance with image data;

(b) forming a developing unit having a developing roller and a toner, wherein said developing unit has a function to develop said electrostatic latent image;

(c) applying said toner to a surface of said developing roller by rotating said developing roller until at least the area near the contact between the developing roller and photoreceptor is completely covered with said toner;

(d) establishing contact between said developing roller with said toner applied to the surface of said developing roller and said photoreceptor, and setting up a combination of said developing roller with said toner applied and said photoreceptor unit; and (e) operating an assembled image forming apparatus to perform functional tests of said image forming apparatus.

14. A method of manufacturing an image forming apparatus, comprising the steps of:

(a) forming a photoreceptor unit having a photoreceptor, wherein said photoreceptor unit has a function to form an electrostatic latent image that appears with a laser beam applied in accordance with image data;

(b) forming a developing unit having a developing roller and a toner, wherein said developing unit has a function to develop said electrostatic latent image;

(c) applying said toner to a surface of said developing roller by rotating said developing roller until the whole surface of said developing roller is completely covered with said toner;

(d) establishing contact between said developing roller with said toner applied to the surface of said developing roller and said photoreceptor, and setting up a combination of said developing roller with said toner applied and said photoreceptor unit; and (e) operating an assembled image forming apparatus to perform functional tests of said image forming apparatus.

15. A method of manufacturing an image forming apparatus, comprising the steps of:

(a) forming a plurality of photoreceptor units, wherein each of said plurality of photoreceptor units has each individual photoreceptor;

(b) forming a plurality of developing units, wherein each of said plurality of developing units has each individual toner and developing roller, said individual toners have color toners different in color from each other, and said individual color toners are disposed in said individual developing units;

(c) applying individual color toner to a surface of said individual developing roller; and (d) setting up a combination of said individual developing unit which includes said individual developing roller with said individual color toner applied, and said individual photoreceptor unit.

16. The method of manufacturing an image forming apparatus as defined in claim 15, wherein the step of setting up a combination of said individual developing unit and said individual photoreceptor unit includes a process of establishing contact between said individual developing roller with said individual toner applied to the surface of said individual developing roller and said individual photoreceptor with each other, and combining said individual photoreceptor unit and said individual developing unit with each other.

17. The method of manufacturing an image forming apparatus as defined in claim 15, wherein the step of setting up a combination of said developing unit and said photoreceptor unit includes a process of establishing contact between said developing roller with said toner applied to the surface of said developing roller and said photoreceptor with each other, while said toner applied to the surface of said developing roller is lain between said developing roller and said photoreceptor, and combining said photoreceptor unit and said developing unit with each other.

18. The method of manufacturing an image forming apparatus as defined in claim 16, wherein said individual developing roller has a first shape that is at least one of cylindrical and columnar;

said individual photoreceptor has a second shape that is at least one of cylindrical and columnar; and said individual photoreceptor unit and said individual developing unit are combined with each other in a manner such that said developing roller having said first shape and said photoreceptor unit having said second shape are parallel to each other in the lengthwise direction.

19. The method of manufacturing an image forming apparatus as defined in claim 16, wherein the step of applying said individual toner to the surface of said individual developing roller includes a process of applying said individual toner to the surface of said individual developing roller by rotating said individual developing roller;

said individual photoreceptor unit has a function to form an electrostatic latent image formed by application of a laser beam in accordance with image data; and said individual developing unit has a function to develop said electrostatic latent image.

20. The method of manufacturing an image forming apparatus as defined in claim 16, wherein the step of applying said individual color toner to the surface of said individual developing roller includes a process of rotating said individual developing roller until at least the area near the contact between said individual developing roller and said individual photoreceptor is completely covered with said individual color toner.

21. The method of manufacturing an image forming apparatus as defined in claim 16, wherein the step of applying said individual color toner to the surface of said individual developing roller includes a process of rotating said individual developing roller until the whole surface of said individual developing roller is completely covered with said individual color toner.

22. The method of manufacturing an image forming apparatus as defined in claim 16, further comprising a step of:

(e) operating an assembled image forming apparatus to perform functional tests of said image forming apparatus.

* * * * *

UNITED STATES PATENT AND TRADEMARK OFFICE

CERTIFICATE OF CORRECTION

PATENT NO. : 6,445,894 B2
DATED : September 3, 2002
INVENTOR(S) : Narahara et al.

It is certified that error appears in the above-identified patent and that said Letters Patent is hereby corrected as shown below:

Title page,
Delete Item "[*] Notice: This patent issued on a continued prosecution application filed under 37 CFR 1.53(d), and is subject to the twenty year paten term provisions of 35 U.S.C. 154(a)(2)."

Signed and Sealed this

Twenty-second Day of July, 2003

JAMES E. ROGAN
*Director of the United States Patent and Trademark Office*